April 12, 1960 U. A. MATSON 2,932,804
TRANSFORMER SYSTEM
Filed Dec. 30, 1950 5 Sheets-Sheet 1

INVENTOR
U. A. MATSON
BY
Ralph T. Holcomb
ATTORNEY

April 12, 1960     U. A. MATSON     2,932,804
TRANSFORMER SYSTEM Filed Dec. 30, 1950     5 Sheets-Sheet 2

INVENTOR
U. A. MATSON
BY
Ralph T. Holcomb
ATTORNEY

April 12, 1960  U. A. MATSON  2,932,804
TRANSFORMER SYSTEM
Filed Dec. 30, 1950                     5 Sheets-Sheet 3

INVENTOR
U. A. MATSON
BY
Ralph T. Holcomb
ATTORNEY

April 12, 1960     U. A. MATSON     2,932,804
TRANSFORMER SYSTEM Filed Dec. 30, 1950     5 Sheets-Sheet 4

INVENTOR
U. A. MATSON
BY
Ralph T. Holcomb
ATTORNEY

April 12, 1960

U. A. MATSON 2,932,804

TRANSFORMER SYSTEM

Filed Dec. 30, 1950

INVENTOR
U. A. MATSON
BY
Ralph T. Holcomb
ATTORNEY

United States Patent Office 2,932,804
Patented Apr. 12, 1960

2,932,804

TRANSFORMER SYSTEM

Uno A. Matson, Upper Montclair, N.J., assignor to Bell Telephone Laboratories, Incorporated, New York, N.Y., a corporation of New York Application December 30, 1950, Serial No. 203,656

32 Claims. (Cl. 333—28)

This invention relates to wave transmission and more particularly to multiple transformer systems.

The object of the invention is to provide a wide-band transformer system which has a constant, non-reactive input image impedance and a voltage transformation which is constant or smoothly varying in both amplitude and phase.

The transformer system of the present invention comprises a low-frequency unit and a high-frequency unit, having adjoining or overlapping transmission bands, connected between a common pair of input terminals and a common pair of output terminals. Each unit comprises a transformer and one or more associated networks which may include either resistive or reactive impedances, or combinations thereof. In one basic form the input sides of both units are connected in series and the output sides are also connected in series. In another basic form the output sides of the units are connected in series but their input sides are connected in parallel. The associated networks may, for example, include resistances associated, respectively, with one winding of each of the transformers, an inductance shunting the primary winding of one of the transformers, series combinations of resistance and capacitance connected in shunt, respectively, with each winding of the other transformer, and a series resistance separating the resistance-capacitance combinations. Additional impedance elements, either resistive or reactive, may be added for impedance correction or for other purposes.

The values of the component impedance elements are so chosen that the input image impedance of the transformer system is substantially constant and non-reactive over the entire operating frequency range and the voltage transformation ratio is substantially constant or varies smoothly in both magnitude and phase. An important feature of the system is that the leakage inductance of the low-frequency transformer is made a part of the basic structure, thus substantially eliminating transmission irregularities otherwise caused thereby, especially near the junction of the low-frequency and the high-frequency bands. The turns ratios of the transformers may be selected to provide a gain-frequency characteristic which is substantially constant, rises monotonically, or falls monotonically. Corresponding to every gain characteristic there are four constant or smoothly varying phase shift-frequency characteristics, determined by the polling of the transformer windings.

The multiple transformer system in accordance with the present invention may be used to provide constant or smoothly varying transmission between any appropriate source and load. It is particularly suitable for use between a vacuum tube plate or grid of high impedance and a transmission line. It may also be used to connect two transmission lines of different impedance.

The nature of the invention will be more fully understood from the following detailed description and by reference to the accompanying drawings, of which.

Figure 1:
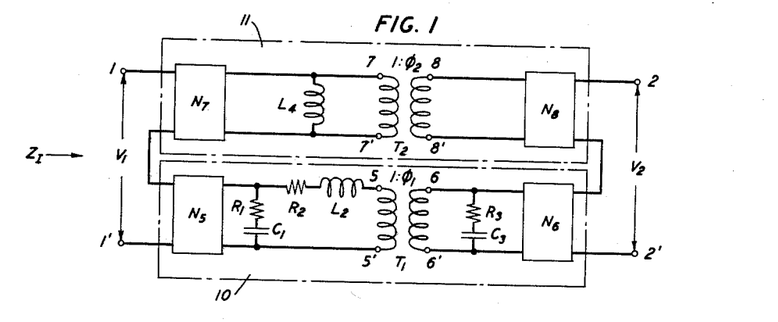
Fig. 1 is a schematic circuit of one basic form of a multiple transformer system in accordance with the invention in which the low-frequency unit and the high-frequency unit are connected in series on both sides.

Taking up the figures in greater detail, the basic form of the multiple transformer system shown in Fig. 1 comprises a four-terminal low-frequency unit 10 and a four-terminal high-frequency unit 11, each shown enclosed in a broken-line box, connected between a pair of input terminals 1, 1' and a pair of output terminals 2, 2'. Any suitable wave source, not shown, may be connected to the input terminals 1, 1' and any siutable load impedance, not shown, to the output terminals 2, 2'. The units 10 and 11 are connected in series on their input sides and also in series on their output sides. The system may be designed, as hereinafter explained, to have an input image impedance $Z_1$ at terminals 1, 1' which is substantially a constant resistance and a voltage transformation between terminals 1, 1' and terminals 2, 2' which is substantially constant or smoothly varying in both amplitude and phase over the entire range extending from the lower cut-off frequency $f_1$ to the upper cut-off frequency $f_2$. The two units have adjoining transmission bands. Unit 10 transmits from $f_1$ to $f_x$, the cross-over frequency, and unit 11 from $f_x$ to $f_2$. The input voltage of the system at terminals 1, 1' is indicated as $V_1$ and the output voltage at terminals 2, 2' as $V_2$.

The low-frequency unit 10 comprises two four-terminal networks $N_5$ and $N_6$ coupled by a low-frequency transformer $T_1$ having a primary winding 5—5' and a secondary winding 6—6' with a turns ratio 1:$\phi_1$ between primary and secondary. A first impedance branch comprising the series combination of a resistance $R_1$ and a capacitance $C_1$ is connected in shunt between the network $N_5$ and the transformer $T_1$, a second branch made up of a resistance $R_2$ and an inductance $L_2$ in series is interposed in series between the first branch and the transformer, and a third branch consisting of the series combination of a resistance $R_3$ and a capacitance $C_3$ shunts the secondary 6—6' of the transformer. The resistance $R_2$ includes the resistance of the primary and secondary windings of the transformer $T_1$ as referred to the primary side. The inductance $L_2$ represents the leakage inductance between the transformer windings as referred to the primary side. The component impedance branches of the networks $N_5$ and $N_6$ are essentially resistive over a broad range of frequencies above and below the cross-over frequency $f_x$, but for equalization purposes they may be allowed to become reactive in the neighborhood of the cut-off frequencies $f_1$ and $f_2$. The resistance corresponding to the core loss of the transformer $T_1$ may be included in whole or in part in the network $N_5$ or the network $N_6$. The transformer $T_1$ has its lower cut-off at the frequency $f_1$ and is designed to transmit as wide a band as possible consistent with the magnitudes of the source and load impedances between which the system is to operate.

Figure 4:
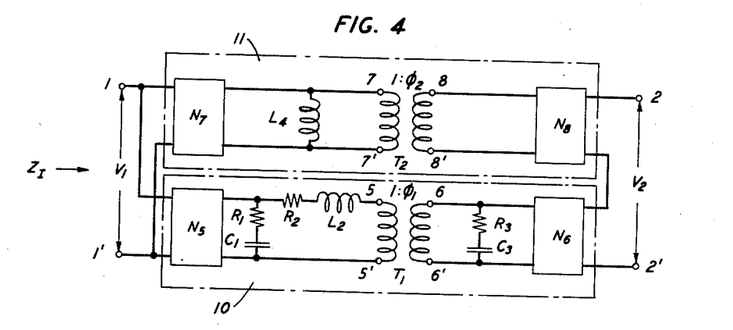
Fig. 4 is a schematic circuit of another basic form in accordance with the invention in which the units are connected in parallel on one side and in series on the other.

The high-frequency unit 11 comprises two four-terminal networks $N_7$ and $N_8$ coupled by a high-frequency transformer $T_2$ having a primary winding 7—7' and a secondary winding 8—8' with a turns ratio 1:$\phi_2$ between primary and secondary. The primary winding 7—7' is shunted by an inductance $L_4$ which preferably includes part or all of the mutual inductance between the windings of the transformer $T_2$ as referred to the primary side. The networks $N_7$ and $N_8$ may include wholly or in part the resistance of the windings of the transformer $T_2$ and the resistance corresponding to the core loss. The component impedance branches of the networks $N_7$ and $N_8$ are essentially resistive over the frequency range from $f_1$ to $f_2$ but may be made reactive near the upper cut-off frequency $f_2$ for equalization purposes. The transformer $T_2$ is designed to transmit as wide a band as possible with $f_2$ as the upper cut-off. The lower cut-off is in the neighborhood of $f_x$.

Figure 6:
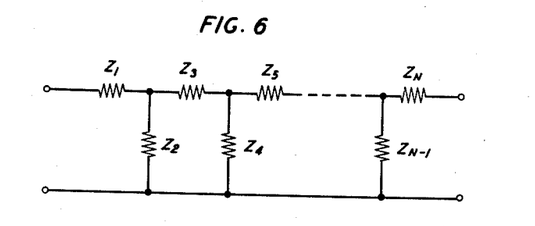
Fig. 6 is a schematic circuit of a ladder-type structure suitable for use as the associated networks $N_5$, $N_6$, $N_7$ and $N_8$ shown in block in Figs. 1 and 4.

Fig. 6 shows a four-terminal network suitable for use as the networks $N_5$, $N_6$, $N_7$ and $N_8$. It is a ladder-type structure comprising series impedance branches $Z_1$, $Z_3$, $Z_5$ and $Z_N$ and interposed shunt impedance branches $Z_2$, $Z_4$ and $Z_{N-1}$. It will be understood, of course, that other types of equivalent networks may be substituted for the ladder type. In its simplest form the network may reduce to a single series or shunt branch. In some cases one or more of the networks may be omitted entirely.

Figure 2:
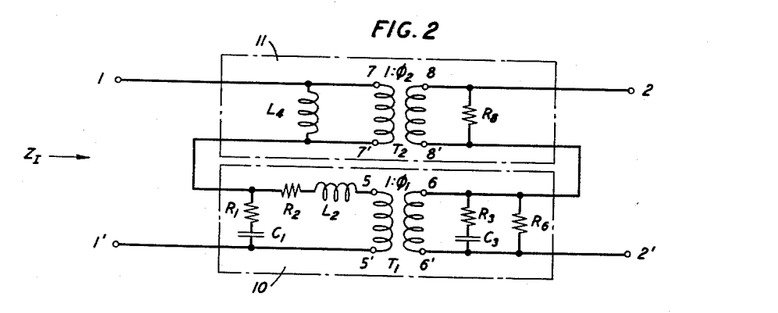
Figs. 2 and 3 are specific circuits of the general type shown in Fig. 1.
Figure 3:
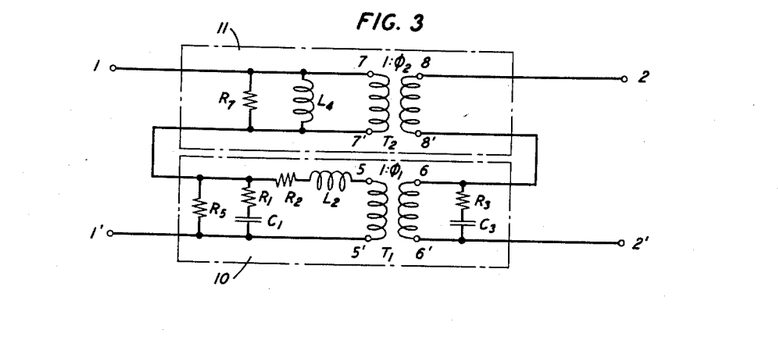

Figs. 2 and 3 show simple forms of the transformer system of Fig. 1. In Fig. 2 the networks $N_5$ and $N_7$ are omitted, the network $N_6$ is simply the shunt resistance $R_6$, and the network $N_8$ is represented by the shunt resistance $R_8$. In Fig. 3 the networks $N_6$ and $N_8$ are omitted and the networks $N_5$ and $N_7$ are represented by the shunt resistance $R_5$ and $R_7$, respectively.

Fig. 4 shows another basic form of the transformer system differing from that of Fig. 1 only in that the units 10 and 11 are connected in parallel, instead of in series, on their input sides. As explained below, the system may be designed to have the same types of impedance and transmission characteristics as those obtainable with the circuit shown in Fig. 1.

Figure 5:
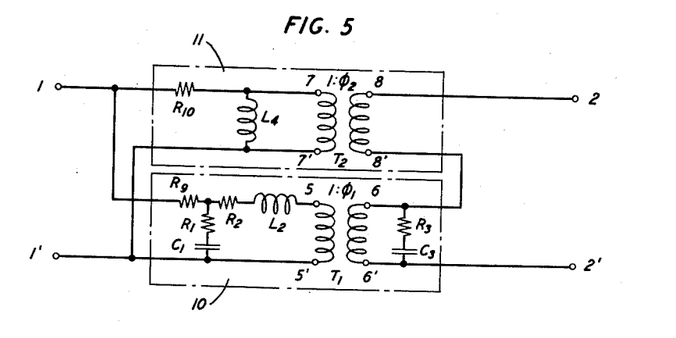
Fig. 5 is a specific circuit of the general type shown in Fig. 4.

A simple form of the system of Fig. 4 is shown in Fig. 5, wherein the networks $N_6$ and $N_8$ are omitted and the networks $N_5$ and $N_7$ are simply the series resistances $R_9$ and $R_{10}$, respectively.

The relationships between the values of the various component impedance elements required to provide the desired image impedance and transmission characteristics for the transformer systems of Figs. 1 and 4 will now be considered, with the aid of the equivalent circuits shown in Figs. 7, 7A, 7B, 8, 8A and 8B.

First, for purposes of analysis, the four-terminal networks $N_5$, $N_6$, $N_7$ and $N_8$ will be replaced by their equivalent T structures. For convenience it will be assumed that the component elements of these networks are purely resistive. This assumption is strictly true for an ideal system of the type under consideration and will be substantially true in a practical system over the entire transmission band except in the neighborhood of the lower and upper cut-off frequencies $f_1$ and $f_2$. Therefore, the high-frequency unit 11 of Figs. 1 and 4 is replaced by the equivalent circuit shown in Fig. 7. The network $N_7$ is a T structure comprising the series resistances $R_{71}$ and $R_{73}$ with an interposed shunt resistance $R_{72}$ and the network $N_8$ is a second T structure made up of the series resistances $R_{81}$ and $R_{83}$ with the resistance $R_{82}$ connected in shunt therebetween. In order to facilitate identification, in Figs. 7, 7A, 7B, 8, 8A and 8B the elements corresponding to the four-terminal networks are enclosed in broken-line boxes.

Figure 7:
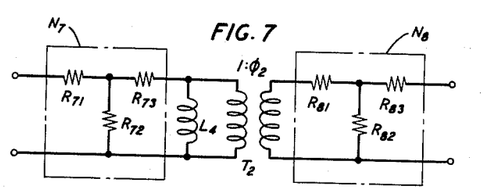
Fig. 7 shows the circuit of the high-frequency unit 11 of Fig. 1 or Fig. 4 when the associated networks $N_7$ and $N_8$ are represented by generalized T-type structures.
Figure 7A:
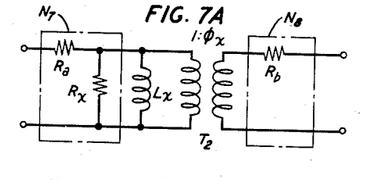
Figs. 7A and 7B are specific circuits of high-frequency units adapted for use in the systems shown in Figs. 1 and 4, respectively.

For use in the analysis of the system of Fig. 1, the circuit of Fig. 7 is converted to the equivalent circuit shown in Fig. 7A. Here, the turns ratio of the transformer $T_2$ is $\phi_x$, the value of the shunt inductance is $L_x$, the network $N_7$ is now an L structure comprising a series resistance $R_a$ followed by a shunt resistance $R_x$, and the network $N_8$ is a single series resistance $R_b$.

In order to make the circuits shown in Figs. 7 and 7A equivalent, $R_a$, $R_b$, $R_x$, $L_x$ and $\phi_x$ have the following relationships with respect to the values given in Fig. 7:

$$R_a = R_{71} + \frac{R_{72}R_{73}}{R_{72}+R_{73}} \quad (1)$$

$$R_b = R_{83} + \frac{R_{81}R_{82}}{R_{81}+R_{82}} \quad (2)$$

$$R_x = \frac{1}{\frac{R_{72}+R_{73}}{R_{72}^2} + \frac{(R_{72}+R_{73})^2 \phi_2^2}{(R_{81}+R_{82})R_{72}^2}} \quad (3)$$

$$L_x = L_4\left(\frac{R_{72}}{R_{72}+R_{73}}\right)^2 \quad (4)$$

and $$\phi_x = \phi_2 \frac{(R_{72}+R_{73})R_{82}}{(R_{81}+R_{82})R_{73}} \quad (5)$$

Figure 7B:
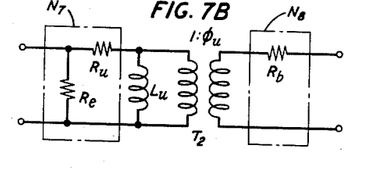

For use in the analysis of the system of Fig. 4, the circuit of Fig. 7A is modified as shown in Fig. 7B. Here the transformer $T_2$ has a turns ratio $\phi_u$, the shunt inductance a value $L_u$, and the network $N_7$ is an L-structure comprising a shunt resistance $R_e$ followed by a series resistance $R_u$. The following relationships are required in order to make the circuits of Figs. 7A and 7B equivalent:

$$R_e = R_a + R_x \quad (6)$$

$$R_u = \frac{R_a}{R_x}(R_a + R_x) \quad (7)$$

$$L_u = L_x\left(\frac{R_a+R_x}{R_x}\right)^2 \quad (8)$$

and $$\phi_u = \phi_x \frac{R_a}{R_a+R_x} \quad (9)$$

In the low-frequency unit 10 of Figs. 1 and 4 the two resistance-capacitance branches have approximately the same time constant, that is, $$C_1 R_1 = C_3 R_3 \quad (10)$$

The theoretical value of the separating resistance $R_2$ is approximately equal to the sum of $R_1$ and $R_3$ when all three resistances are referred to the same side of the transformer $T_1$, that is, $$R_2 = R_1 + \frac{R_3}{\phi_1^2} \qquad (11)$$

The preferred actual value of this resistance is found by subtracting from the value of $R_2$, as determined by Equation 11, the resistance of the primary and secondary windings of the transformer $T_1$ as referred to the primary side. If the resistance of these windings is equal to $R_2$, no added resistance will be required.

Figure 8:
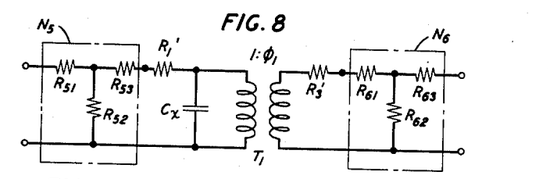
Fig. 8 shows a circuit, used in analysis, equivalent to that of the low-frequency unit 10 of Fig. 1 or Fig. 4 when the associated networks $N_5$ and $N_6$ are represented by generalized T-type structures.

For analysis, this low-frequency unit is replaced by the equivalent circuit shown in Fig. 8. Here, the network $N_5$ is a T structure comprising the series resistance $R_{51}$ and $R_{53}$ with an interposed shunt resistance $R_{52}$ and the network $N_6$ is a second T structure constituted by the series resistances $R_{61}$ and $R_{63}$ with the resistance $R_{62}$ connected in shunt between them. It is also desirable that the portion of the low-frequency unit 10 between the networks $N_5$ and $N_6$ in Fig. 8 be of the same general configuration as the portion of the high-frequency unit 11 between the works $N_7$ and $N_8$ in Fig. 7. In that each should comprise a transformer with a reactance shunting the primary winding. This reactance should be an inductance for unit 11 and a capacitance for unit 10. Thus, Fig. 7 is of the proper configuration for unit 11, the shunt inductance being $L_4$. Fig. 8 shows the desired configuration for the unit 10, the shunt capacitance being $C_x$. In order to make the portion of the circuit of Fig. 8 between the networks $N_5$ and $N_6$ equivalent to the corresponding portion of the circuit of Figs. 1 and 4, the resistances $R_1'$ and $R_3'$ are introduced, and the following relationship must obtain:

$$R_1' = R_1 \qquad (12)$$

$$R_3' = R_3 \qquad (13)$$

$$C_x = C_1 + C_3 \phi_1^2 \qquad (14)$$

and $$\frac{L_3}{C_x} = \frac{R_1 R_3}{\phi_1^2} \qquad (15)$$

Figure 8A:
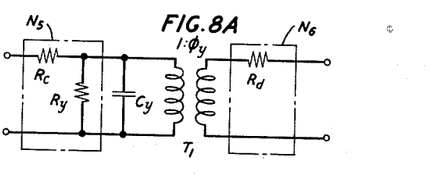
Figs. 8A and 8B are equivalent circuits representing low-frequency units adapted for use in the systems shown in Figs. 1 and 4, respectively.

For use in the analysis of the system of Fig. 1, the circuit of Fig. 8 is modified as sworn in Fig. 8A. The turns ratio of the transformer $T_1$ is changed from $\phi_1$ to $\phi_y$, the value of the shunt capacitance $C_x$ is changed to $C_y$, the network $N_5$ is changed from a T structure to an L structure comprising a series resistance $R_c$ followed by a shunt resistance $R_y$, and the T structure of the network $N_6$ is changed to a single series resistance $R_d$. For equivalence between the circuits of Figs. 8 and 8A the following relationships are required:

$$R_c = R_{51} + \frac{R_{52}(R_{53} + R_1')}{R_{52} + R_{53} + R_1'} \qquad (16)$$

$$R_d = R_{63} + \frac{R_{62}(R_3' + R_{61})}{R_{62} + R_3' + R_{61}} \qquad (17)$$

$$R_y = \frac{1}{\frac{R_{52} + R_{53} + R_1'}{R_{52}^2} + \frac{(R_{52} + R_{53} + R_1')^2 \phi_1^2}{(R_3' + R_{61} + R_{62})R_{52}^2}} \qquad (18)$$

$$C_y = C_x \left(\frac{R_{52} + R_{53} + R_1'}{R_{52}}\right)^2 \qquad (19)$$

and $$\phi_y = \phi_1 \frac{R_{62}(R_{52} + R_{53} + R_1')}{R_{52}(R_{61} + R_{62} + R_3')} \qquad (20)$$

Figure 8B:
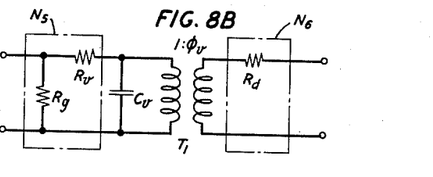

For use in the analysis of the system of Fig. 4, the circuit of Fig. 8A is modified as shown in Fig. 8B. Here the transformer $T_1$ has a turns ratio $\phi_v$, the shunt capacitance a value $C_v$, and the network $N_5$ is an L structure comprising a shunt resistance $R_g$ followed by a series resistance $R_v$. The relationships required to make the circuits of Figs. 8A and 8B equivalent are the following:

$$R_s = R_c + R_v \qquad (21)$$

$$R_g = \frac{R_c}{R_v}(R_c + R_v) \qquad (22)$$

$$C_v = C_y \left(\frac{R_v}{R_c + R_v}\right)^2 \qquad (23)$$

and $$\phi_v = \phi_y \left(\frac{R_v}{R_c + R_v}\right) \qquad (24)$$

All of the required equivalent circuits have now been developed. In the analysis which follows it will be assumed that in the transformer system shown in Fig. 1 the high-frequency unit 11 is equivalent to the circuit of Fig. 7A and the low-frequency unit 10 is equivalent to the circuit of Fig. 8A, and that in the system shown in Fig. 4 unit 11 is equivalent to the circuit of Fig. 7B and unit 10 is equivalent to the circuit of Fig. 8B.

In order to insure that the input image impedance $Z_I$ for both of the systems will be constant and non-reactive throughout the frequency range from $f_1$ to $f_2$, it is necessary to establish two additional relationships, besides those already given. These are, for Fig. 1, $$\frac{L_x}{C_y} = R_x^2 = R_y^2 \qquad (25)$$

and, for Fig. 4, $$\frac{L_u}{C_v} = R_u^2 = R_v^2 \qquad (26)$$

Then, for Fig. 1, $$Z_I = R_a + R_c + R_x \qquad (27)$$

and, for Fig. 4, $$Z_I = \frac{1}{\frac{1}{R_s} + \frac{1}{R_g} + \frac{1}{R_v}} \qquad (28)$$

Expressions giving the output voltage $V_2$ at terminals 2, 2' of the system in terms of the input voltage $V_1$ at terminals 1, 1' will now be presented for the circuits shown in Figs. 1 and 4. Four different cases are to be distinguished, depending upon the poling arrangement employed for the windings of the transformers $T_1$ and $T_2$.

For condition I, which gives minimum phase shift, the windings are so poled that a series aiding connection for transformer $T_1$ results if terminals 5' of the primary winding is connected to terminal 6 of the secondary winding, and also a series aiding connection for transformer $T_2$ results if terminal 7' is connected to terminal 8. In this case, for Fig. 1, $$V_2 = V_1 \frac{R_x(\pm \phi_y \pm j\phi_x \omega/\omega_a)}{(R_a + R_c + R_x)(1 + j\omega/\omega_a)} \qquad (29)$$

and, for Fig. 4, $$V_2 = V_1 \frac{\pm \phi_v \pm j\phi_u \omega/\omega_b}{1 + j\omega/\omega_b} \qquad (30)$$

where $$\omega_a = \frac{R_x}{L_x} = \frac{1}{R_y C_y} \qquad (31)$$

$$\omega_b = \frac{R_u}{L_u} = \frac{1}{R_v C_v} \qquad (32)$$

and $\omega$ is the angular frequency at any frequency $f$. In Equations 29 and 30, plus signs are used where alternatives are given.

In Equation 29, the term in which $\phi_y$ appears is the output voltage of the low-frequency unit 10 in Fig. 1, and the term including $\phi_x$ is the output voltage of the high-frequency unit 11. In Equation 30, the term including $\phi_v$ represents the output voltage of unit 10 in Fig. 4, and the term in which $\phi_u$ appears is the output voltage of unit 11.

For condition II the windings are so poled that, with the terminals connected as indicated under condition I, a series opposing connection would be obtained in each of the transformers. Under these circumstances the output voltage for Fig. 1 is given by Equation 29 and that for Fig. 4 by Equation 30, using minus signs where alternatives are given.

For condition III the windings are so poled that, with similar connections of the terminals, a series aiding connection would result for $T_1$ but a series opposing connection for $T_2$. For this case the output voltages for Figs. 1 and 4 may be found from Equations 29 and 30, respectively, using plus signs for the first alternative and minus for the second.

For condition IV the windings are so poled that, with similar connections of the terminals, a series opposing connection would be obtained for $T_1$ but a series aiding connection for $T_2$. Here, the output voltage for Fig. 1 is given by Equation 29 and that for Fig. 4 by Equation 30, using minus signs for the first alternative and plus for the second.

Figure 9:
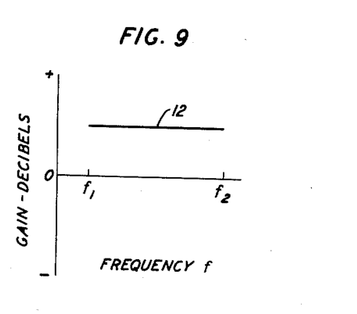
Figs. 9, 10 and 11 show, respectively, typical flat, rising and falling gain-frequency characteristics obtainable with the transformer system of Fig. 1 or Fig. 4 when operating between a resistive source and a high-impedance load.
Figure 10:
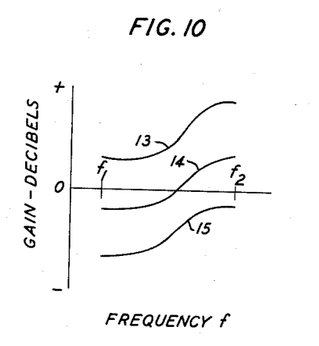
Figures 11, 14, 15, 18:
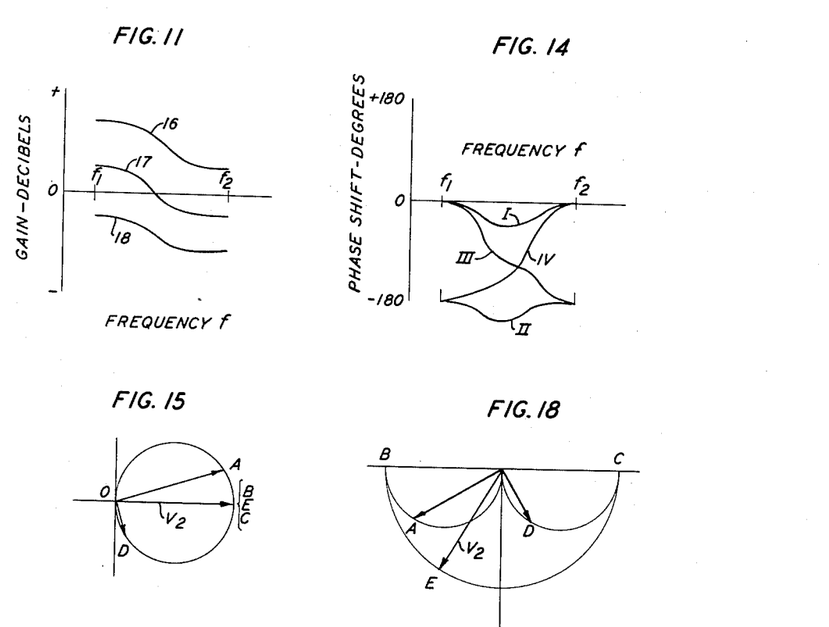
Figs. 12, 13 and 14 show typical phase shift-frequency characteristics corresponding, respectively, to the gain characteristics shown in Figs. 9, 10 and 11, for four different poling arrangements of the windings of the transformers $T_1$ and $T_2$.
Figs. 15, 16 and 17 are vector diagrams showing the relationship between the input and output voltages of the system of Fig. 1 or Fig. 4 corresponding to the gain characteristics shown, respectively, in Figs. 9, 10 and 11, for one poling arrangement.
Figs. 18, 19 and 20 are similar vector diagrams for another poling arrangement.
Figure 12:
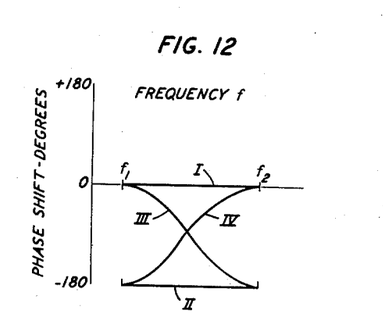
Figure 13:
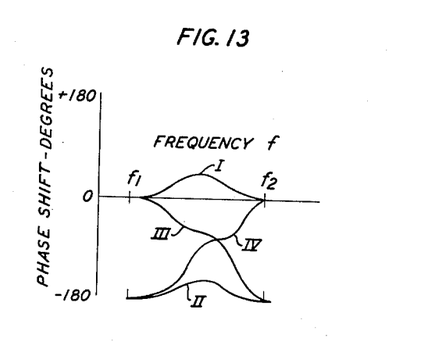

The various types of transmission and phase shift characteristics obtainable with the transformer systems shown in Figs. 1 and 4 will now be considered. Since the two circuits are potentially equivalent except for the flat loss, any type of characteristic given by one may, by proper design, be duplicated in the other. There are three general types of gain-frequency characteristics, flat, rising, or falling, as shown in Figs. 9, 10, and 11, depending upon the choice of the turns ratios for the transformers $T_1$ and $T_2$. For each gain characteristic there are four types of phase shift-frequency characteristics, as shown in Figs. 12, 13, and 14, corresponding to the poling of the transformer windings.

For Fig. 1 if $\phi_x$ and $\phi_y$, shown in Figs. 7A and 8A, are equal, or for Fig. 4 if $\phi_u$ and $\phi_v$, shown in Figs. 7B and 8B, are equal, the gain will be constant over the frequency range between $f_1$ and $f_2$, as shown by curve 12 in Fig. 9, where gain in decibels is plotted against the frequency $f$. The amount of gain depends upon the magnitude of the equal turns ratio. For a proper choice of this magnitude the gain can be made positive, as shown by curve 12, zero or negative. When the gain is flat, the phase characteristic may take any one of the forms shown by the curves I, II, III and IV in Fig. 12, where the designations correspond with the four poling conditions described above. In curve I the phase shift is zero and in curve II it is −180 degrees throughout the band, in curve III it falls smoothly from zero to −180 degrees, and in curve IV rises smoothly from −180 degrees to zero.

Fig. 10 shows the type of gain characteristic obtainable if $\phi_x$ is greater than $\phi_y$ for Fig. 1 or $\phi_u$ is greater than $\phi_v$ for Fig. 4. The gain rises monotonically with frequency and, depending upon the magnitudes of the turns ratios chosen, may be entirely above, cross, or be entirely below the axis as shown by the typical curves 13, 14 and 15, respectively. The corresponding phase characteristics for poling conditions I, II, III and IV are shown by the similarly designated curves in Fig. 13.

If $\phi_x$ is less than $\phi_y$ for Fig. 1 or $\phi_u$ is less than $\phi_v$ for Fig. 4, the gain characteristic falls monotonically with frequency as shown by the typical curves in Fig. 11. Depending upon the magnitudes of the turns ratios selected, the gain may be all positive, go from positive to negative, or be all negative, as shown, respectively, by the curves 16, 17 and 18. The phase characteristics associated with poling conditions I, II, III and IV are shown by the correspondingly designated curves in Fig. 14.

Figure 16:
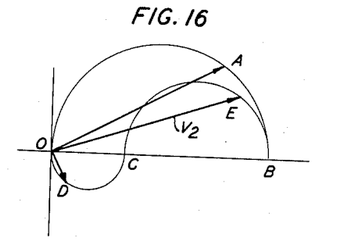
Figure 17:
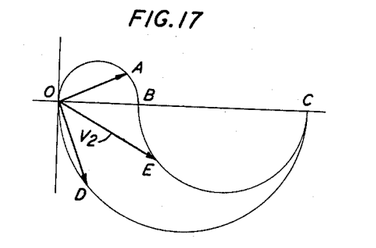
Figure 19:
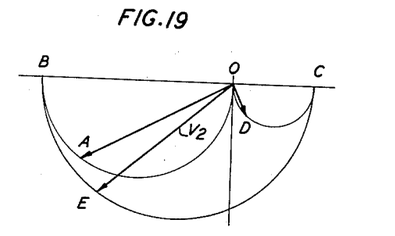
Figure 20:
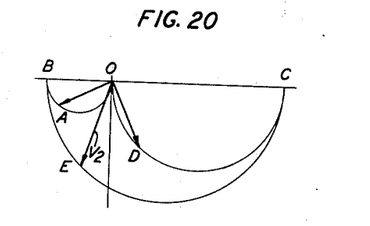

If desired, a vector diagram may be used to find graphically at any frequency $f$ the relationship between the output voltage $V_2$ and the input voltage $V_1$, from which the gain characteristic of the transformer system may be determined, and also the phase angle between these voltages, which corresponds to the phase shift. Typical vector diagrams for ideal circuits of the types shown in Figs. 1 and 4 are presented in Figs. 15 through 20. Figs. 15, 16 and 17 correspond to the flat, rising and falling gain characteristics shown in Figs. 9, 10 and 11, respectively, for poling condition I with minimum phase characteristics shown by curves I in Figs. 12, 13 and 14, respectively. The diagrams in Figs. 18, 19 and 20 also relate to the gain characteristics shown in Figs. 9, 10 and 11, respectively, but are for poling condition III with phase characteristics shown by curves III in Figs. 12, 13 and 14, respectively. Of course, similar sets of vector diagrams may be constructed for poling conditions II and IV.

In each of the diagrams the input voltage $V_1$ of the system at terminals 1, 1' is represented by a vector, not shown, extending from the origin O horizontally to the right a distance corresponding to the magnitude of $V_1$. The vector OA represents the output voltage of the high-frequency unit 11 at a selected frequency $f$ within the band of the system, the vector OD, which always makes a right angle with OA, represents the output voltage of the low-frequency unit 10, and OE is the resultant vector representing the output voltage $V_2$ of the system at terminals 2, 2'. At the lower cut-off frequency $f_1$ the terminus of the vector OA coincides with the origin O, and as the frequency increases to $f_2$ the terminus traverses the semicircular path OAB to the point B. The terminus of the vector OD starts at the point C for the frequency $f_1$ and, as the frequency increases to $f_2$, follows the semicircular path CDO to the origin O. At the frequency $f_1$ the terminus of the resultant vector OE is at the point C and, as the frequency increases, traces the semicircular path CEB to the point B.

In the diagram of Fig. 15, corresponding to constant gain and poling condition I, it will be noted that the path of the terminus of the resultant vector OE shrinks to a point. That is, the points B, C and E coincide. This means that ideally the phase shift is zero throughout the band, as shown by curve I in Fig. 12. In Fig. 16, which corresponds to rising gain and poling condition I, the resultant vector OE always increases in length with frequency and makes a positive angle with the horizontal which first increases and then decreases in magnitude. Therefore the gain characteristic, shown in Fig. 10, rises with frequency and the phase characteristic, given by curve I in Fig. 13, has a positive hump. In Fig. 17, however, the vector OE decreases continuously with frequency and makes at first an increasing and then a decreasing negative angle with the horizontal. This means that the corresponding gain characteristic, given in Fig. 11, falls with frequency and the phase characteristic, shown by curve I in Fig. 14, has a negative hump. In Fig. 18, which corresponds to flat gain and poling condition III, the vector OE has the same length at all frequencies but makes a negative angle with the horizontal which starts at zero and increases to 180 degrees. The phase characteristic, given by curve III in Fig. 12, therefore falls continuously from zero to −180 degrees. From this partial analysis of the vector diagrams given in Figs. 15 to 20 it will be apparent that they are very useful tools for determining, at least qualitatively, both the gain and the phase characteristics of the transformer systems, without resorting to formulas such as 29 and 30 which give explicity the output voltage $V_2$ in terms of the input voltage $V_1$.

For simpler structures the required relationships between the component elements given above for the generalized transformer systems of the type shown in Figs. 1 and 4 take a simpler form. For example, the only necessary relationships applying to the circuit of Fig. 2 are those given by Equations 10, 11 and the following:

$$\frac{L_2}{C_1 + C_3\phi_1^2} = \frac{R_1 R_3}{\phi_1^2} \qquad (33)$$

and $$\frac{L_4}{C_1 + C_3\phi_1^2} = \left(\frac{R_8}{\phi_2^2}\right)^2 = \left(\frac{R_3 + R_6}{\phi_1^2}\right)^2 \qquad (34)$$

The input image impedance $Z_I$ is $$Z_I = R_1 + \frac{R_8}{\phi_2^2} \qquad (35)$$

and the output voltage $V_2$ is $$V_2 = V_1 \frac{R_8\left(\pm \frac{\phi_1 R_6}{R_3 + R_6} \pm j\phi_2 \omega/\omega_c\right)}{(R_1\phi_2^2 + R_8)(1 + j\omega/\omega_c)} \qquad (36)$$

where $$\omega_c = \frac{R_8}{L_4 \phi_2^2} \qquad (37)$$

and the choice of sign in the two places where alternatives are given depends upon the poling condition of the transformer windings, as described above. For condition I both signs are plus, for condition II both are minus, for condition III the first is plus and the second minus, and for condition IV the first is minus and the second plus.

Figure 21:
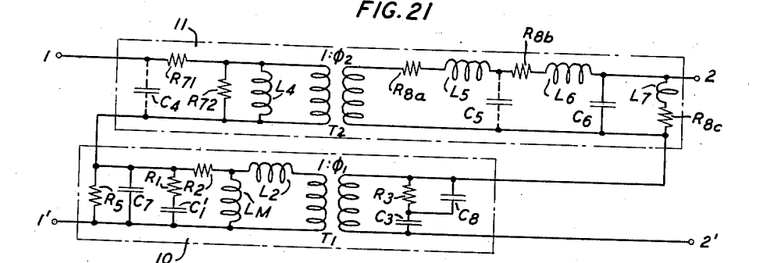
Fig. 21 is another specific circuit of the general type shown in Fig. 1, including additional impedance elements for high-frequency equalization.
Figure 22:
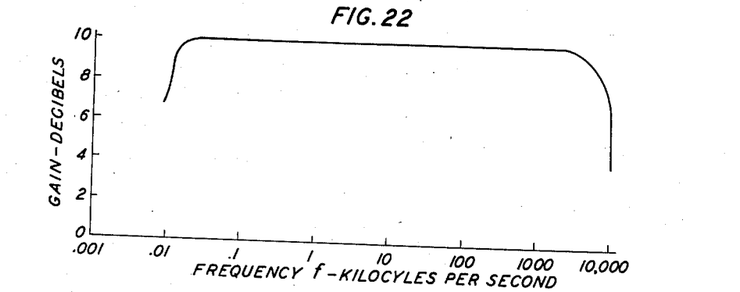
Fig. 22 shows the gain-frequency characteristic for the transformer system of Fig. 21.

Fig. 21 shows schematically the circuit of a multiple transformer system of the Fig. 1 type designed to cover a frequency range extending approximately from 10 cycles to 8.5 megacycles per second, when working out of a resistive impedance and into a vacuum tube of high impedance connected to the output terminals 2, 2′. The voltage gain, expressed in decibels, between input and output is shown in Fig. 22 plotted against the frequency $f$ in kilocycles, using a logarithmic scale. It will be noted that the characteristic is substantially flat over the entire range from $f_1$ to $f_2$, with no appreciable irregularities in the region of the cross-over frequency $f_x$ between the low-frequency band of unit 10 and the high-frequency band of unit 11.

In Fig. 21 the elements $C_3$, $L_2$, $R_1$, $R_2$, $R_3$, $T_1$ and $T_2$ correspond to those similarly designated in Fig. 1. The resistance $R_5$ represents the network $N_5$ of Fig. 1, the resistances $R_{71}$ and $R_{72}$ represent the network $N_7$ and the resistances $R_{8a}$, $R_{8b}$, and $R_{8c}$ represent the network $N_8$. Network $N_6$ is omitted. The required relationships between the values of these elements are given in the design formulas already presented. The shunt inductance $L_M$ represents the inherent mutual inductance of transformer $T_1$ as referred to the primary side. This mutual inductance causes the voltage gain to fall off below the frequency $f_1$, as shown in Fig. 22. The capacitances $C_4$, $C_5$, $C_6$, $C_7$ and $C_8$ and the inductances $L_5$, $L_6$ and $L_7$ are added to provide gain equalization in the neighborhood of the upper cut-off frequency $f_2$. The values of these reactances are selected or adjusted to give the flattest possible band. The capacitance $C_1'$ has approximately the value given by the equation $$C_1' = C_1 - C_7 \qquad (38)$$

The value of $C_1$ may be obtained from Equation 10.

What is claimed is:

1. A multiple transformer system comprising two transformers having adjoining transmission bands connected between two pairs of terminals, a first resistance connected at one end to a winding of the first of said transformers, a second resistance connected at one end to a winding of the second of said transformers, the other ends of said resistances being connected together, the series combination of a third resistance and a first capacitance connected to the terminals of one winding of said first transformer, the series combination of a fourth resistance and a second capacitance connected to the terminals of the other winding of said first transformer, the series combination of a fifth resistance and a first inductance effectively in series with one of said resistance-capacitance combinations and a winding of said first transformer, and a second inductance shunting a winding of said second transformer, said resistance-capacitance combinations having approximately the same time constant, said fifth resistance being approximately equal to the sum of said third and fourth resistances when all three are referred to the same side of said first transformer, and the ratio of said first inductance to the sum of said capacitances, when all three are referred to the same side of said first transformer, being approximately equal to the product of said third and fourth resistances when both are referred to said same side of said first transformer.

2. A system in accordance with claim 1 in which said transformers are connected in series on both sides.

3. A system in accordance with claim 2 in which said first resistance is connected in shunt with a winding of said first transformer and said second resistance is connected in shunt with a winding of said second transformer.

4. A system in accordance with claim 2 in which said first and second resistances are connected in shunt, respectively, with the secondary windings of said transformers.

5. A system in accordance with claim 2 in which said first and second resistances are connected in shunt, respectively, with the primary windings of said transformers.

6. A system in accordance with claim 1 in which said transformers are connected in parallel on one side and in series on the other side.

7. A system in accordance with claim 6 in which said first resistance is connected in series with a winding of said first transformer and said second resistance is connected in series with a winding of said second transformer.

8. A system in accordance with claim 6 in which said transformers are connected in parallel on their input sides.

9. A system in accordance with claim 8 in which said first and second resistances are connected in series, respectively, with the primary windings of said transformers.

10. A system in accordance with claim 1 in which said fifth resistance is on the input side of said first transformer.

11. A system in accordance with claim 1 in which said fifth resistance includes the effective resistance of the windings of said first transformer.

12. A system in accordance with claim 1 which has an input image impedance which is substantially constant and non-reactive over the transmission band of the system.

13. A system in accordance with claim 1 which includes additional impedance elements for impedance correction within the transmission band.

14. A multiple transformer system comprising two transformers having primary windings connected in series, secondary windings connected in series and adjoining transmission bands, a resistance $R_8$ shunting the secondary of one of said transformers, an inductance $L_4$ shunting the primary of said one transformer, a resistance $R_6$ shunting the secondary of the other of said transformers, the series combination of a resistance $R_1$ and a capacitance $C_1$ shunting the primary of said other transformer, a resistance $R_2$ effectively in series with the primary of said other transformer, and the series combination of a resistance $R_3$ and a capacitance $C_3$ shunting the secondary of said other transformer, the component elements of said system being proportioned with respect to the inherent leakage inductance $L_2$ between the windings of said other transformer to provide a substantially smooth transmission characteristic for the system over a frequency range extending from the lower end of one of said bands to the upper end of the other of said bands and an input image impedance which is substantially constant and non-reactive over said frequency range, and said elements having approximately the following relationships:

$$C_1R_1 = C_3R_3$$
$$R_2 = R_1 + R_3/\phi_1^2$$
$$\frac{L_2}{C_1+C_3\phi_1^2} = \frac{R_1R_3}{\phi_1^2}$$

and $$\frac{L_4}{C_1+C_3\phi_1^2} = \left(\frac{R_8}{\phi_2^2}\right)^2 = \left(\frac{R_3+R_6}{\phi_1^2}\right)^2$$

where $\phi_1$ is the turns ratio between the primary and the secondary windings of said one transformer and $\phi_2$ is the turns ratio between the primary and the secondary windings of said other transformer.

15. A system in accordance with claim 14 in which the resistance $R_2$ includes the effective resistance of the windings of said first transformer.

16. A system in accordance with claim 14 which includes additional impedance elements for impedance correction within the transmission band.

17. A system in accordance with claim 14 in which said resistance $R_2$ is effectively located between the primary of said other transformer and said combination of $R_1$ and $C_1$.

18. A system in accordance with claim 14 in which said transformers have equal turns ratios.

19. A system in accordance with claim 14 in which the windings of said transformers are poled for minimum phase shift throughout said bands.

20. A system in accordance with claim 19 in which said transformers have equal turns ratios.

21. A system in accordance with claim 1 in which the ratio of said second inductance, as referred to the input side of said second transformer, to the sum of said capacitances, as referred to the input side of said first transformer, is approximately equal to the square of said second resistance, as referred to the input side of said second transformer.

22. A system in accordance with claim 1 in which the ratio of said second inductance, as referred to the input side of said second transformer, to the sum of said capacitances, as referred to the input side of said first transformer, is approximately equal to the square of the sum of said first and fourth resistances, as referred to the input side of said first transformer.

23. A system in accordance with claim 1 in which the ratio of said second inductance, as referred to the input side of said second transformer, to the sum of said capacitances, as referred to the input side of said first transformer, is approximately equal to the square of said second resistance, as referred to the input side of said second transformer, and is also approximately equal to the square of the sum of said first and fourth resistances, as referred to the input side of said first transformer.

24. A system in accordance with claim 1 in which said first inductance includes the leakage inductance of said first transformer.

25. A system in accordance with claim 1 in which the windings of said transformers are poled for minimum phase shift throughout said bands.

26. A system in accordance with claim 25 in which the turns ratios of said transformers are chosen to provide a substantially flat gain characteristic throughout said bands.

27. A system in accordance with claim 1 in which the windings of said transformers are poled for maximum phase shift throughout said bands.

28. A system in accordance with claim 1 in which the windings of said transformers are poled for a falling phase shift throughout said bands.

29. A system in accordance with claim 1 in which the windings of said transformers are poled for a rising phase shift throughout said bands.

30. A system in accordance with claim 1 in which the turns ratios of said transformers are chosen to provide a substantially flat gain characteristic throughout said bands.

31. A system in accordance with claim 1 in which the turns ratios of said transformers are chosen to provide a rising gain characteristic throughout said bands.

32. A system in accordance with claim 1 in which the turns ratios of said transformers are chosen to provide a falling gain characteristic throughout said bands.

References Cited in the file of this patent

UNITED STATES PATENTS

| | | |
|---|---|---|
| 2,024,900 | Wiener et al. | Dec. 17, 1935 |
| 2,067,444 | Gewertz | Jan. 12, 1937 |
| 2,301,245 | Bode | Nov. 10, 1942 |